(12) United States Patent
Yu

(10) Patent No.: US 9,664,124 B2
(45) Date of Patent: May 30, 2017

(54) TECHNIQUES FOR COORDINATED VARIABLE VALVE TIMING AND ELECTRONIC THROTTLE CONTROL

(71) Applicant: Songping Yu, Troy, MI (US)

(72) Inventor: Songping Yu, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 289 days.

(21) Appl. No.: 14/076,463

(22) Filed: Nov. 11, 2013

(65) Prior Publication Data

US 2015/0128904 A1    May 14, 2015

(51) Int. Cl.
    *F02D 41/00*    (2006.01)

(52) U.S. Cl.
    CPC .... *F02D 41/0002* (2013.01); *F02D 2041/001* (2013.01); *F02D 2041/002* (2013.01); *F02D 2200/0406* (2013.01); *F02D 2200/0411* (2013.01); *F02D 2250/18* (2013.01); *Y02T 10/18* (2013.01); *Y02T 10/42* (2013.01)

(58) Field of Classification Search
    CPC ........... F02D 41/0002; F02D 2041/001; F02D 2041/002; F02D 2200/0406; F02D 2200/0411; F02D 2250/18; F02D 13/00; F02D 13/0203; F02D 13/0215; F02D 41/001
    USPC ................. 701/102, 103; 123/403, 404, 405, 123/345–348, 360, 361, 402, 306, 308, 123/432, 90.11, 90.15, 321; 73/114.31, 73/114.32, 114.36
    See application file for complete search history.

(56) References Cited

U.S. PATENT DOCUMENTS

| | | | |
|---|---|---|---|
| 5,714,683 A * | 2/1998 | Maloney | F02D 41/1401 340/451 |
| 6,219,611 B1 | 4/2001 | Russell | |
| 6,250,292 B1 * | 6/2001 | Suhre | F02D 41/182 123/361 |
| 6,308,671 B1 * | 10/2001 | Reed | F01L 1/34 123/399 |
| 6,553,964 B2 * | 4/2003 | Arai | F01L 9/04 123/399 |
| 6,636,796 B2 * | 10/2003 | Kolmanovsky | F02D 41/1401 123/480 |
| 6,701,890 B1 * | 3/2004 | Suhre | F02D 11/105 123/350 |

(Continued)

*Primary Examiner* — Thomas Moulis
*Assistant Examiner* — Susan Scharpf
(74) *Attorney, Agent, or Firm* — Ralph E Smith

(57) ABSTRACT

A method can include determining, at a controller for an engine, the controller having one or more processors, a desired air-per-cylinder (APC) for the engine based on an engine torque request. The method can include determining, at the controller, a target intake manifold absolute pressure (MAP) based on a volumetric efficiency of the engine for electronic throttle control (ETC), wherein the volumetric efficiency for ETC is based on the desired APC and an actual MAP. The method can include commanding, by the controller, a throttle of the engine to deliver the target MAP. The method can include determining, at the controller, a target position for an intake valve of the engine based on a volumetric efficiency of the engine for variable valve timing (VVT), engine speed, and the actual MAP. The method can also include commanding, by the controller, the intake valve to the target position.

18 Claims, 3 Drawing Sheets

(56) References Cited

U.S. PATENT DOCUMENTS

| | | | | |
|---|---|---|---|---|
| 6,840,215 B1 * | 1/2005 | Livshiz | F02D 11/105 | 123/352 |
| 6,915,781 B2 * | 7/2005 | Rayl | F02D 11/105 | 123/198 F |
| 6,920,865 B2 * | 7/2005 | Lyon | B60W 10/06 | 123/361 |
| 7,000,589 B2 * | 2/2006 | Matthews | F02D 9/02 | 123/350 |
| 7,021,282 B1 * | 4/2006 | Livshiz | F02D 11/105 | 123/347 |
| 7,275,426 B2 * | 10/2007 | Lahti | F02D 37/02 | 73/114.32 |
| 7,292,931 B2 * | 11/2007 | Davis | F02D 41/18 | 701/102 |
| 7,380,447 B2 | 6/2008 | Rollinger et al. | | |
| 7,565,236 B2 * | 7/2009 | Turin | F02D 41/18 | 701/103 |
| 7,805,984 B2 * | 10/2010 | McLain | F02D 41/221 | 73/114.31 |
| 7,941,260 B2 * | 5/2011 | Lee | G01M 15/05 | 701/59 |
| 8,069,829 B2 * | 12/2011 | Leone | B60W 10/06 | 123/347 |
| 8,122,869 B2 * | 2/2012 | Fujiwara | F02D 13/023 | 123/345 |
| 2005/0056251 A1 * | 3/2005 | Stroh | F02D 11/105 | 123/350 |
| 2007/0113808 A1 * | 5/2007 | Lyngfelt | F01L 1/022 | 123/90.16 |
| 2010/0211294 A1 * | 8/2010 | Soejima | F02D 11/105 | 701/108 |
| 2012/0158374 A1 * | 6/2012 | Muller | F02D 41/2432 | 703/2 |

* cited by examiner

TECHNIQUES FOR COORDINATED VARIABLE VALVE TIMING AND ELECTRONIC THROTTLE CONTROL

FIELD

The present disclosure relates generally to internal combustion engines and, more particularly, to techniques for coordinated variable valve timing and electronic throttle control.

BACKGROUND

Internal combustion engines can draw air into an intake manifold through an induction system that can be regulated by a throttle. The throttle may be electronically actuated, e.g., by a controller, which is also known as electronic throttle control (ETC). The air in the intake manifold can be distributed to a plurality of cylinders and combined with fuel to create an air/fuel mixture. The air/fuel mixture can be combusted within the cylinders to drive pistons that rotatably turn a crankshaft to generate drive torque. Exhaust gas resulting from combustion can be expelled from the cylinders.

Intake valves can control the flow of air (or the air/fuel mixture) into the respective cylinders. Similarly, exhaust valves can control the flow of the exhaust gas out of the respective cylinders. These valves can be electronically actuated, e.g., by a controller. By controlling the timing that the valves open and close, engine performance, fuel economy, and/or emissions can be adjusted. This is also known as variable valve timing (VVT). VVT operation, however, can depend on ETC operation because ETC controls the airflow into the intake manifold.

SUMMARY

In one form, a method is provided in accordance with the teachings of the present disclosure. The method can include determining, at a controller for an engine, the controller having one or more processors, a desired air-per-cylinder (APC) for the engine based on an engine torque request. The method can include determining, at the controller, a target intake manifold absolute pressure (MAP) based on a volumetric efficiency of the engine for electronic throttle control (ETC), wherein the volumetric efficiency for ETC is based on the desired APC and an actual MAP. The method can include commanding, by the controller, a throttle of the engine to deliver the target MAP. The method can include determining, at the controller, a target position for an intake valve of the engine based on a volumetric efficiency of the engine for variable valve timing (VVT), engine speed, and the actual MAP. The method can also include commanding, by the controller, the intake valve to the target position.

In another form, an engine system is provided in accordance with the teachings of the present disclosure. The engine system can include an internal combustion engine configured to generate drive torque in response to an engine torque request. The engine system can include a throttle actuator configured to actuate a throttle of the engine. The engine system can include a valve actuator configured to actuate an intake valve of the engine. The engine system can also include a controller configured to determine a desired APC for the engine based on the engine torque request. The controller can be configured to determine a target MAP based on a volumetric efficiency of the engine for ETC, wherein the volumetric efficiency for ETC is based on the desired APC and an actual MAP. The controller can be configured to command the throttle actuator to control the throttle deliver the target MAP. The controller can be configured to determine a target position for the intake valve based on a volumetric efficiency of the engine for VVT, engine speed, and the actual MAP. The controller can also be configured to command the valve actuator to position the intake valve at the target position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Variable valve timing (VVT) can be scheduled to deliver a desired air-per-cylinder (APC) in an internal combustion engine. This desired APC can be based on an engine torque request, e.g., in response to driver input. The delivered APC can be a function of intake valve position, e.g., intake valve lift, and a measured (actual) intake manifold absolute pressure (MAP). Electronic throttle control (ETC) can control a throttle to achieve a target MAP. However, there can be a delay between actuating the throttle using ETC and the actual MAP reaching the target MAP. Thus, the ETC operation can affect the VVT operation, particularly during transient periods when one or both of the throttle and the intake valve are moving. For example, due to inherent engine intake manifold filling delay, during a transient, the actual generated engine torque can lag behind its requested value. If the VVT is positioned to improve the engine torque response, then engine fuel economy can be compromised.

Accordingly, techniques for coordinated VVT and ETC are presented. In one exemplary implementation, the techniques can decouple the scheduling of the ETC and the VVT, which can deliver the engine torque as requested without compromising fuel economy. In other words, the requested airflow can be delivered with zero or minimal pumping losses (improved fuel economy) while delivering the requested engine torque with zero or minimal delay (improved performance/engine torque response). Further, the need for complex manifold dynamic modeling for estimating the intake manifold filling delay can be eliminated.

Specifically, the techniques can determine the desired APC for the engine based on an engine torque request. The techniques can determine a target MAP based on a volumetric efficiency of the engine for ETC, which can be based on the desired APC and an actual (measured) MAP. The techniques can command a throttle of the engine, e.g., via an actuator, to deliver the target MAP, e.g., using closed-loop feedback. The techniques can also determine a target position for an intake valve of the engine based on a volumetric efficiency of the engine for VVT, engine speed, and the actual MAP, and then command the intake valve to the target position, e.g., a target lift.

Figure 1:
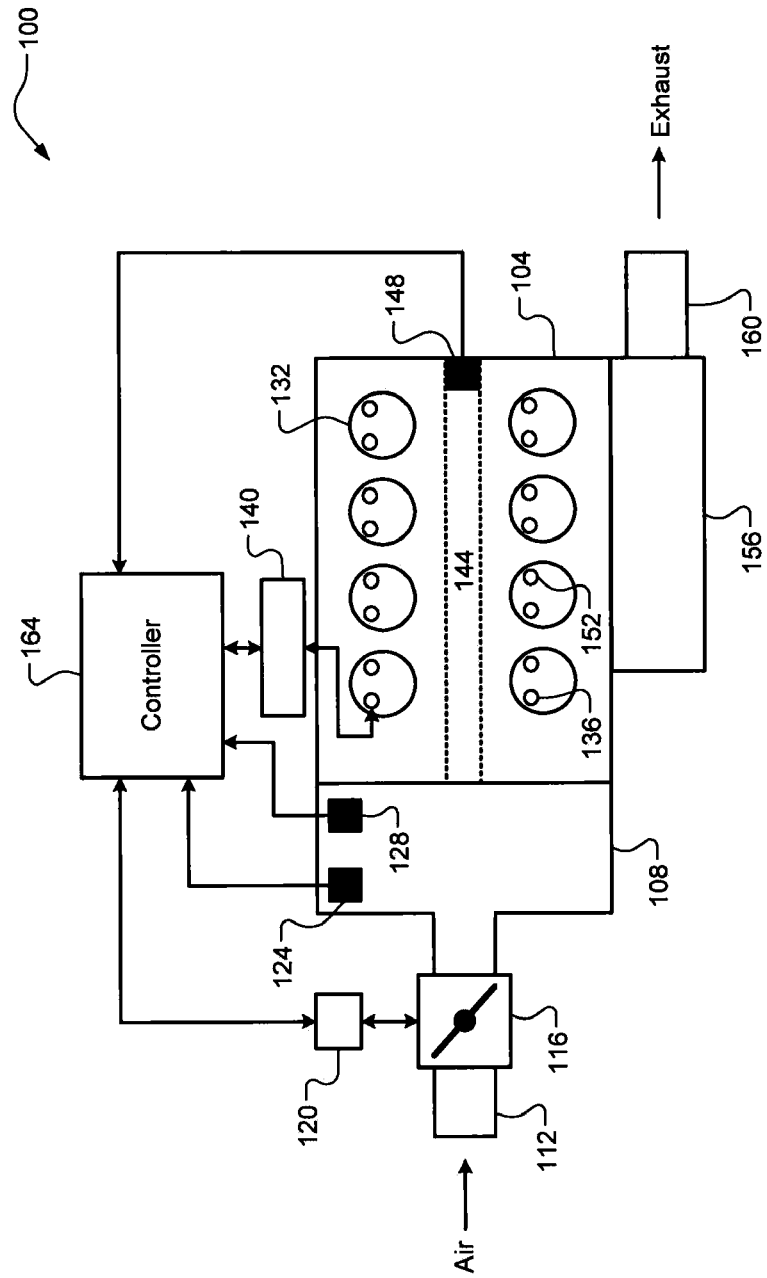
FIG. 1 is an example diagram of an engine system according to the principles of the present disclosure.

Referring now to FIG. 1, an example diagram of an engine system 100 is illustrated. The engine system 100 can be implemented in a vehicle and can be used to propel the vehicle. The engine system 100 can include an internal combustion engine 104. The internal combustion engine 104 can be any suitable engine configured to internally combust an air/fuel mixture to generate drive torque (spark ignition, diesel, homogeneous charge compression ignition, etc.). The engine 104 can draw air into an intake manifold 108 through an induction system 112 that can be regulated by a throttle 116. An example throttle is a butterfly valve. The throttle 116 can be electronically-actuated by a throttle actuator 120 (ETC), which is described in detail below.

A manifold absolute pressure (MAP) sensor 124 can measure a pressure of air in the intake manifold 108. An intake air temperature (IAT) sensor 128 can measure a temperature of air in the intake manifold 108. The air in the intake manifold 108 can be distributed to a plurality of cylinders 132 via respective intake valves 136. For purposes of more clearly describing operation of the techniques of the present disclosure, a single intake valve 136 will be referred to from hereon. A valve actuator 140 can control positioning of the intake valve 136. Examples of the valve actuator 140 include pneumatic, hydraulic, and electrical actuators. The air can be combined with fuel to create an air/fuel mixture that can be combusted within the cylinders 132. The combustion of the air/fuel mixture within the cylinders 132 can drive the pistons (not shown) to rotatably turn a crankshaft 144 to generate drive torque. An engine speed sensor 148 can measure a rotational speed of the crankshaft 144, e.g., in revolutions per minute (RPM).

Exhaust gas resulting from combustion can be expelled from the cylinders 132 via respective exhaust valves 152 into an exhaust manifold 156. While the techniques of the present disclosure are described with respect to VVT for the intake valve 136, it should be appreciated that these techniques could be similarly implemented for VVT of the exhaust valves 152. The exhaust gas in the exhaust manifold 156 can then be treated by an exhaust treatment system 160 before being released into the atmosphere. The exhaust treatment system 160 can include any suitable components for treating the exhaust gas (catalytic converters, nitrogen oxide absorbers/adsorbers, particulate filters, selective catalytic reduction (SCR) systems, etc.). It should be appreciated that the exhaust gas can also be at least partially used for other purposes, such as exhaust gas recirculation (EGR) into the intake manifold 108 and/or powering a turbine of a turbocharger.

A controller 164 can control operation of the engine system 100. The controller 164 can receive measurements from the MAP sensor 124, the IAT sensor 128, and the engine speed sensor 148. In some implementations, the controller 164 may also receive other information/measurements, such as a position of the throttle 116, e.g., from the throttle actuator 120 or another suitable sensor, a position of the intake valve 136, e.g., from the valve actuator 140 or another suitable sensor, and driver input, e.g., from an accelerator pedal depression sensor or another suitable sensor. The controller 164 can also control fuel injection, e.g., by commanding fuel injectors, and control ignition of the air/fuel mixture, e.g., by commanding spark plugs. The controller 164 can also execute the techniques of the present disclosure, which are described in greater detail below.

Figure 2:
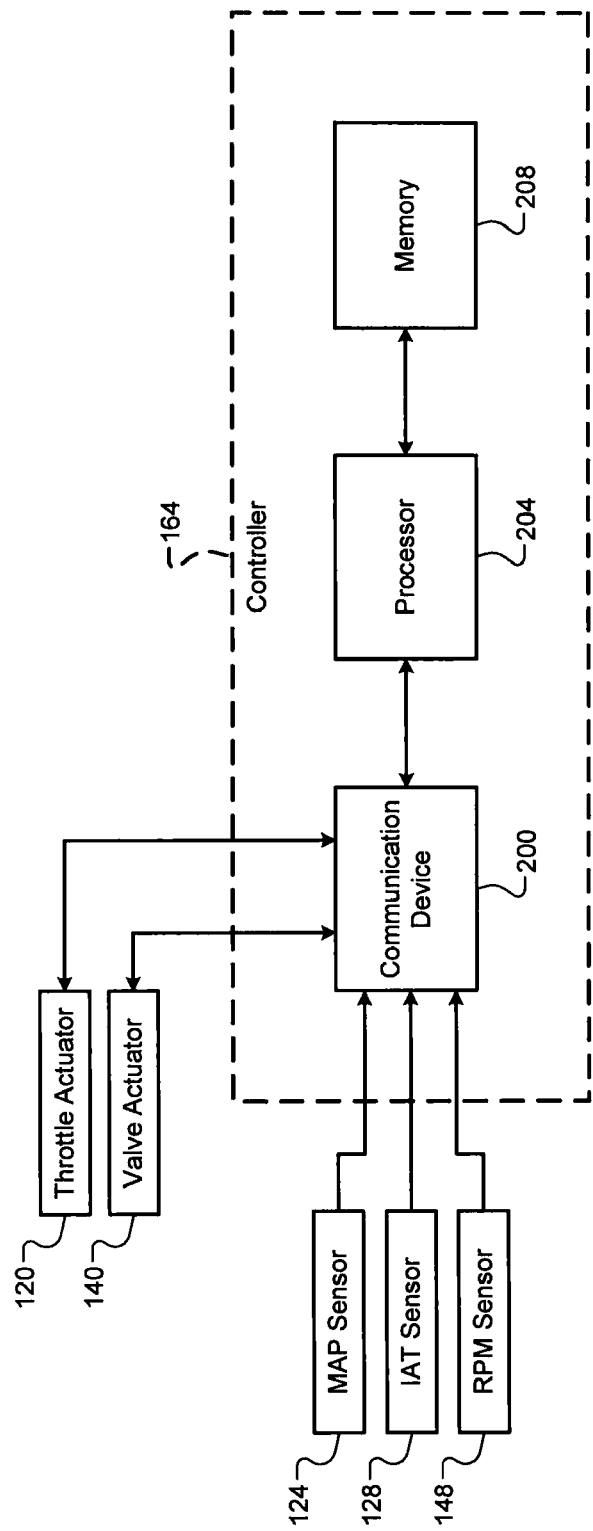
FIG. 2 is an example functional block diagram of a controller according to the principles of the present disclosure.

Referring now to FIG. 2, an example functional block diagram of the controller 164 is illustrated. The controller 164 can include a communication device 200, a processor 204, and a memory 208. It should be appreciated that the term processor 204 as used herein can refer to both a single processor and two or more processors operating in a parallel or distributed architecture. The memory 208 can be any suitable storage medium (flash, hard disk, etc.) configured to store information at the controller 164. For example, the memory 208 can store predetermined engine dynamometer data for use by the techniques of the present disclosure in determining various positions for the intake valve 136.

The communication device 200 can include any suitable components, e.g., a transceiver, configured for communication with components of the engine system 100 via a controller area network (CAN), which is described in further detail below. It should be appreciated that the communication device 200 can also be configured to communicate with other components, e.g., remote servers, via another network, e.g., the Internet. For example, the communication device 200 may communicate with the remote servers via the other network to implement an artificial neural network (ANN) for machine learning.

The processor 204 can be configured to control operation of the controller 164. These functions can include, but are not limited to, loading/executing an operating system of the controller 164, controlling information sent via the communication device 200, processing information received via the communication device 200, and controlling read/write operations at the memory 208. The processor 204 can also wholly or partially execute the techniques of the present disclosure, which are now described in greater detail below.

The processor 204 can determine a desired APC ($APC_{desired}$) for the engine 104 based on an engine torque request ($ET_{request}$). The engine torque request can be in response to and based on driver input, e.g., depression of an accelerator pedal. The desired APC can represent a desired air charge for the cylinders 132 of the engine 104.

The processor 204 can determine an optimal position ($VVT_{optimal}$) for the intake valve 136 based on the desired APC and an engine speed (RPM). The engine speed can be measured by the engine speed sensor 148 and received by the processor 204 via the communication device 200. The optimal position for the intake valve 136 can be optimized for both fuel economy and performance, e.g., engine torque response. In some implementations, the processor 204 can determine the optimal position for the intake valve 136 using predetermined engine dynamometer data, which may be stored at the memory 208. It should be appreciated that the "position" of the intake valve 136 can refer to an amount of lift of the intake valve 136.

The processor 204 can determine a desired volumetric efficiency ($VE_{ETC}$) of the engine 104 for ETC based on the desired APC, the optimal position for the intake valve 136, the engine speed, and an actual MAP. The actual MAP can be measured by the MAP sensor 124 and received by the processor 204 via the communication device 200. In some implementations, the volumetric efficiency of the engine 104 for ETC can be determined using the ANN. In other words, the processor 204 can communicate with remote servers via the communication device 200 to wholly or partially implement the ANN for machine learning in order to calculate volumetric efficiency for ETC.

The processor 204 can determine a target MAP ($MAP_{target}$) based on the volumetric efficiency of the engine 104 for ETC, the desired APC, and intake air parameters. These intake air parameters can include an ideal gas constant (R), intake air temperature (T), and intake air density (D). The ideal gas constant R (also known as the "Regnault constant") represents units of energy (product of pressure and volume) per temperature increment per mole. The intake air temperature T can be the temperature of air in the intake manifold 108, which can be measured using the IAT sensor 128. The intake air density D can be the density of air in the intake manifold 128, and can be determined using other parameters (MAP, barometric pressure/altitude, etc.), or can be measured using another suitable sensor.

In some implementations, the target MAP can be determined using the following equation (Equation 1):

$$MAP_{target} = \frac{120 \times R \times T \times APC_{desired}}{RPM \times D \times VE_{ETC}}, \quad (1)$$

where $MAP_{target}$ represents the target MAP, R represents the ideal gas constant, T represents intake air temperature, $APC_{desired}$ represents the desired APC, RPM represents engine speed, D represents intake air density, and $VE_{ETC}$ represents the volumetric efficiency of the engine 104 for ETC.

The processor 204 can command the throttle actuator 120 to control the throttle 116 to deliver the target MAP using closed-loop feedback. More specifically, the throttle actuator 120 can periodically adjust the position of the throttle 116 based on the actual MAP measured by the MAP sensor 124 until the actual MAP reaches the target MAP. The throttle actuator 120 can then continually adjust the position of the throttle 116 to stabilize the actual MAP measured by the MAP sensor 124 at the target MAP.

The processor 204 can determine a target position ($VVT_{target}$) for the intake valve 136 based on a desired volumetric efficiency ($VE_{VVT}$) of the engine 104 for VVT and the actual MAP. The processor 204 can determine the desired volumetric efficiency for VVT based on the actual MAP, the engine speed, and the desired APC. In some implementations, the processor 204 can determine the target position for the intake valve 136 using the predetermined engine dynamometer data, which may be stored at the memory 208.

The processor 204 can then command the valve actuator 140 to position the intake valve 136 at the target position. As previously discussed, this target position for the intake valve 136 may be a target valve lift for the intake valve 136. The above process can then repeat in response to changes in the engine torque request.

Figure 3:
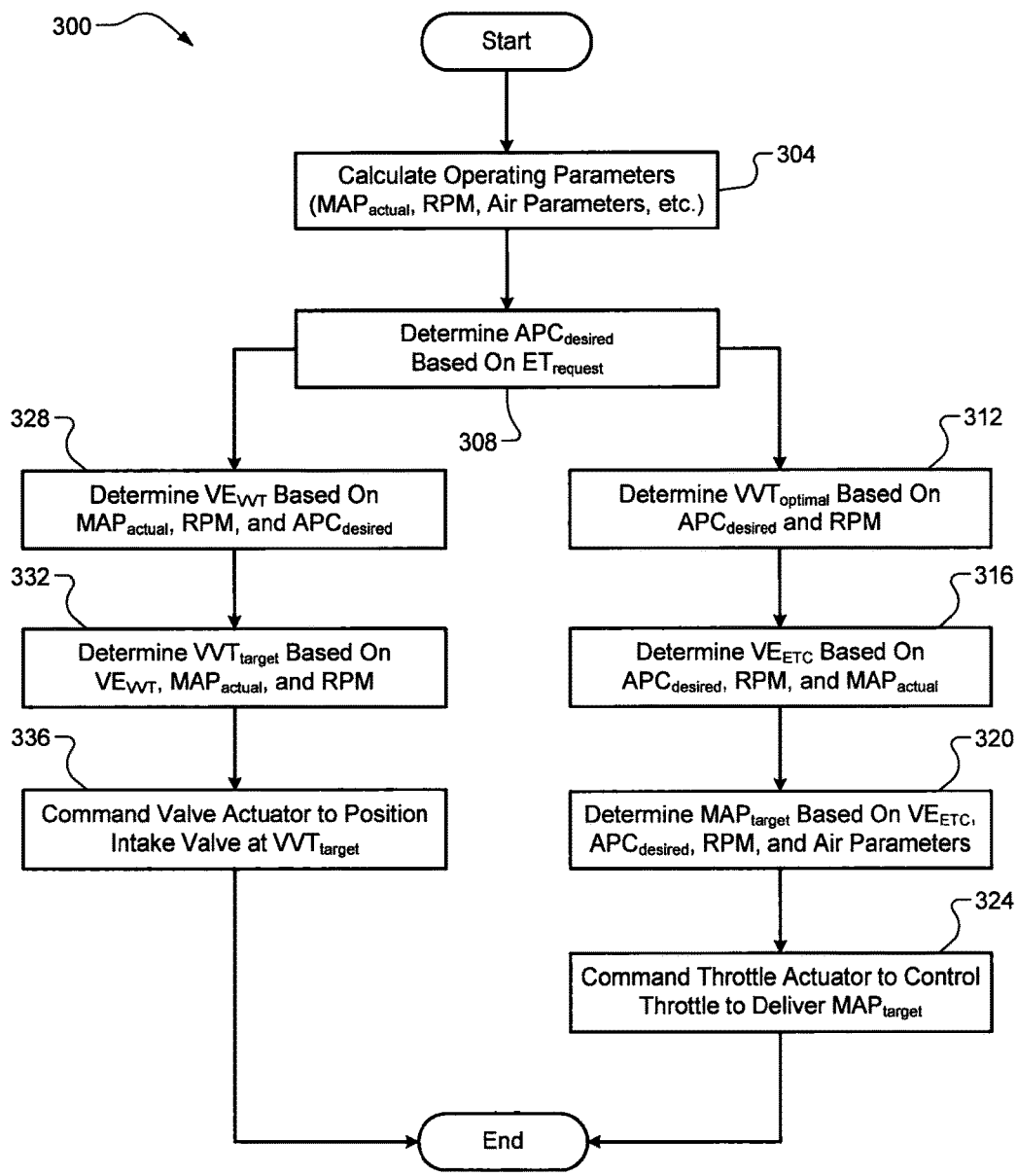
FIG. 3 is an example flow diagram of a method of coordinated variable valve timing (VVT) and electronic throttle control (ETC) according to the principles of the present disclosure.

Referring now to FIG. 3, an example flow diagram of a method 300 for coordinated VVT and ETC is illustrated. It should be noted that the method 300 splits into two branches after step 308 because the VVT control (left branch) and ETC control (right branch) are coordinated and thus can be occurring concurrently or can at least partially overlap.

At 304, the controller 164 can determine operating parameters of the engine 104 (MAP, RPM, air parameters such as IAT and intake air density, etc.). At 308, the controller 164 can determine the desired APC ($APC_{desired}$) based on the engine torque request ($ET_{request}$), e.g., based on driver input. At 312, the controller 164 can determine the optimal position ($VVT_{optimal}$) for the intake valve 136 based on the desired APC ($APC_{desired}$) and the engine speed (RPM). In some implementations, the optimal position ($VVT_{optimal}$) for the intake valve 136 can be determined using the predetermined engine dynamometer data.

At 316, the controller 164 can determine the volumetric efficiency ($VE_{ETC}$) of the engine 104 for ETC based on the desired APC ($APC_{desired}$), the engine speed (RPM), and the actual MAP ($MAP_{actual}$). In some implementations, the volumetric efficiency ($VE_{ETC}$) for ETC can be determined using the ANN. At 320, the controller 164 can determine the target MAP ($MAP_{target}$) based on the volumetric efficiency $VE_{ETC}$ for ETC, the desired APC ($APC_{desired}$), the engine speed (RPM), and parameters of the air in the intake manifold 108 (ideal gas constant R, air temperature T, air density D, etc.). In some implementations, the target MAP ($MAP_{target}$) can be calculated using Equation 1. At 324, the controller 164 can command the throttle actuator 120 to control the throttle 116 to provide the target MAP ($MAP_{target}$). In some implementations, this can include using closed-loop feedback control of the throttle 116 via the throttle actuator 120. Control can then end or return to 304 for one or more additional cycles.

At 328, the controller 164 can determine the volumetric efficiency ($VE_{VVT}$) of the engine 104 for VVT based on the actual MAP ($MAP_{actual}$), the engine speed (RPM), and the desired APC ($APC_{desired}$). At 332, the controller 164 can determine the target position ($VVT_{target}$) for the intake valve 136 based on the volumetric efficiency ($VE_{VVT}$) for VVT, the actual MAP ($MAP_{actual}$), and the engine speed (RPM). In some implementations, the target position ($VVT_{target}$) for the intake valve 136 can be determined using the predetermined engine dynamometer data. At 336, the controller 164 can command the valve actuator 140 to position the intake valve 136 at the target position ($VVT_{target}$). Control can then end or return to 304 for one or more additional cycles.

By coordinating ETC and VVT, the functional objectives for these two controls can be decoupled: ETC can be controlled to deliver the target MAP and VVT can be controlled to achieve the desired APC based on the actual MAP. Using the MAP as the control target, intake manifold filling delay can be minimized or eliminated without complex manifold dynamic modeling. More particularly, using the actual MAP to schedule VVT for the requested engine torque, the effects of intake manifold filling delay on the actual engine torque delivery can be minimized or eliminated completely. In other words, once the actual MAP reaches the target MAP, the actual VVT position will merge to its desired VVT position, thereby optimizing fuel economy and engine torque response at the same time.

Further, both the ETC and VVT positioning can be scheduled in a feed-forward manner, which can improve response speed, and the closed-loop feedback control of ETC can be used to further enhance the accuracy and stability of the ETC control. Since the physical VVT position is now scheduled based on the actual MAP, there can be a better correlation between the VVT position and the achieved APC. The accuracy of the delivered engine torque can be improved, and calibration requirements can be reduced while providing more robust results. In addition, current VVT phasing delays can be significantly reduced or eliminated completely.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

What is claimed is:

1. A method, comprising:
    determining, at a controller for an engine, the controller having one or more processors, a desired air-per-cylinder (APC) for the engine based on an engine torque request;
    determining, at the controller, a volumetric efficiency of the engine for electronic throttle control (ETC) based on the desired APC, an optimal lift for an intake valve of a cylinder of the engine, engine speed, and an actual intake manifold absolute pressure (MAP), wherein the optimal lift for the intake valve is optimized for engine torque response;
    determining, at the controller, a target MAP based on the volumetric efficiency of the engine for ETC;
    determining, at the controller, a target lift for the intake valve based on a volumetric efficiency of the engine for variable valve timing (VVT), engine speed, and the actual MAP; and
    performing, by the controller, coordinated control of ETC and VVT by concurrently:
        (i) commanding the throttle, via closed-loop feedback based on the actual MAP, to deliver the target MAP, and
        (ii) commanding the intake valve to the target lift to deliver the desired APC.

2. The method of claim 1, further comprising determining, at the controller, the optimal lift for an intake valve of the engine based on the desired APC and the engine speed.

3. The method of claim 2, wherein the optimal lift for the intake valve is further optimized for fuel economy.

4. The method of claim 1, wherein the target MAP is determined based on the volumetric efficiency for ETC, the desired APC, and parameters of air in the intake manifold.

5. The method of claim 4, wherein the target MAP is determined using equation:

$$\text{MAP}_{target} = \frac{120 \times R \times T \times APC_{desired}}{RPM \times D \times VE_{ETC}},$$

where $\text{MAP}_{target}$ represents the target MAP, R represents an ideal gas constant, T represents intake air temperature, $APC_{desired}$ represents the desired APC, RPM represents engine speed, D represents intake air density, and $VE_{ETC}$ represents the volumetric efficiency for ETC.

6. The method of claim 1, wherein the volumetric efficiency of the engine for VVT is determined based on the actual MAP, engine speed, and the desired APC.

7. The method of claim 1, wherein (i) the determining of the desired APC, the determining of the target MAP, and the commanding of the throttle at least partially overlaps with (ii) the determining of the target lift and the commanding of the intake valve.

8. The method of claim 1, wherein the coordinate control of ETC and VVT occurs during a coordinated control period during which the commanding of the throttle and the intake valve at least partially overlaps.

9. The method of claim 1, wherein, after a period of the coordinated control of ETC and VVT, when the actual MAP reaches the target MAP, (a) an actual lift of the intake valve merges with (b) the optimal lift of the intake valve.

10. An engine system, comprising:
    an internal combustion engine configured to generate drive torque in response to an engine torque request;
    a throttle actuator configured to actuate a throttle of the engine;
    a valve actuator configured to actuate an intake valve of a cylinder of the engine; and
    a controller configured to:
        determine a desired air-per-cylinder (APC) for the engine based on the engine torque request;
        determine a volumetric efficiency of the engine for electronic throttle control (ETC) based on the desired APC, an optimal lift for the intake valve, engine speed, and an actual intake manifold absolute pressure (MAP), wherein the optimal lift for the intake valve is optimized for engine torque response
        determine a target MAP based on the volumetric efficiency of the engine for ETC;
        determine a target lift for the intake valve based on a volumetric efficiency of the engine for variable valve timing (VVT), engine speed, and the actual MAP; and
        perform coordinated control ETC and VVT by concurrently:
            (i) commanding the throttle actuator, via closed-loop feedback based on the actual MAP, to control the throttle to deliver the target MAP, and
            (ii) commanding the valve actuator to position the intake valve at the target lift to deliver the desired APC.

11. The engine system of claim 10, wherein the controller is further configured to determine the optimal lift for the intake valve based on the desired APC and an engine speed.

12. The engine system of claim 11, wherein the optimal lift for the intake valve is further optimized for fuel economy.

13. The engine system of claim 10, wherein the target MAP is determined based on the volumetric efficiency for ETC, the desired APC, and parameters of air in the intake manifold.

14. The engine system of claim 13, wherein the target MAP is determined using equation:

$$\text{MAP}_{target} = \frac{120 \times R \times T \times APC_{desired}}{RPM \times D \times VE_{ETC}},$$

where $MAP_{target}$ represents the target MAP, R represents an ideal gas constant, T represents intake air temperature, $APC_{desired}$ represents the desired APC, RPM represents engine speed, D represents intake air density, and $VE_{ETC}$ represents the volumetric efficiency for ETC.

15. The engine system of claim 10, wherein the controller is further configured to determine the volumetric efficiency for VVT based on the actual MAP, engine speed, and the desired APC.

16. The engine system of claim 10, wherein (i) the determining of the desired APC, the determining of the target MAP, and the commanding of the throttle at least partially overlaps with (ii) the determining of the target lift and the commanding of the intake valve.

17. The engine system of claim 10, wherein the coordinate control of ETC and VVT occurs during a coordinated control period during which the commanding of the throttle actuator and the intake valve actuator at least partially overlaps.

18. The engine system of claim 10, wherein, after a period of the coordinated control of ETC and VVT, when the actual MAP reaches the target MAP, (a) an actual lift of the intake valve merges with (b) the optimal lift of the intake valve.

* * * * *